United States Patent [19]

Prentice et al.

[11] Patent Number: 5,350,279
[45] Date of Patent: Sep. 27, 1994

[54] GAS TURBINE ENGINE BLADE RETAINER SUB-ASSEMBLY

[75] Inventors: Ian F. Prentice; Jerome A. Juenger, both of Cincinnati, Ohio

[73] Assignee: General Electric Company, Cincinnati, Ohio

[21] Appl. No.: 85,356

[22] Filed: Jul. 2, 1993

[51] Int. Cl.⁵ ............................................. F01D 5/32
[52] U.S. Cl. ............................................. 416/220 R
[58] Field of Search ..................... 416/219 R, 220 R

[56] References Cited

U.S. PATENT DOCUMENTS

| | | | |
|---|---|---|---|
| 3,479,009 | 11/1969 | Bean | 416/216 |
| 3,653,781 | 4/1972 | Cooper | 416/221 |
| 3,888,601 | 6/1975 | Glassburn | 416/220 |
| 4,033,705 | 7/1977 | Leubering | 416/220 R |
| 4,208,170 | 6/1980 | Tucker et al. | 416/221 |
| 4,221,542 | 9/1980 | Acres et al. | 416/220 R |
| 4,265,595 | 5/1981 | Bucy, Jr. et al. | 416/220 R |
| 4,405,285 | 9/1983 | Surdi | 416/220 |
| 4,478,554 | 10/1984 | Surdi | 416/221 |
| 4,502,841 | 3/1985 | Kebedjis | 416/220 R |
| 4,767,276 | 8/1988 | Barnes et al. | 416/221 |
| 4,890,981 | 10/1990 | Corsmeier et al. | 416/220 R |

OTHER PUBLICATIONS

"Illustrations of Prior Blade Retainer Assemblies," FIGS. 1, 2, 3, & 3A.

Primary Examiner—John T. Kwon
Attorney, Agent, or Firm—Jerome C. Squillaro; John R. Rafter

[57] ABSTRACT

A blade retaining sub-assembly for use in a gas turbine engine which includes at least one radially extending blade mounted in a dovetail slot of a rotatable annular disk. The sub-assembly prevents the blade from migrating from the dovetail slot in an axially forward direction and includes a pair of circumferentially spaced lugs extending from a pair of adjacent disk posts such that each of the lugs are disposed axially forward of, and circumferentially adjacent to, respective ones of the lateral surfaces of the blade dovetail. The sub-assembly further includes a retainer plate disposed in each of the lugs and the plate restrained. The plate includes a body section and a contoured platform which is disposed in confronting relationship with the blade dovetail, wherein the contoured platform includes a periphery which is predeterminedly shaped and positioned so as to enhance a load carrying capability of the plate and lugs. The plate is restrained by a bracket attached to a spacer having an aft portion disposed in the dovetail slot inward of the blade, wherein the bracket includes a slotted mount hole which enhances a capability of the plate to flex about an axis which is generally parallel to a radially extending centerline passing through the hole.

10 Claims, 4 Drawing Sheets

GAS TURBINE ENGINE BLADE RETAINER SUB-ASSEMBLY

BACKGROUND OF THE INVENTION 1.0 Field of the Invention

The present invention relates generally to gas turbine engines and, more particularly, to a blade retainer sub-assembly for use in gas turbine engines.

2.0 Related Art

Conventional high bypass ratio turbofan engines, which are included in the more general category of gas turbine engines and which may be used for aircraft propulsion, typically include a fan, booster, high pressure compressor, combustor, high pressure turbine and low pressure turbine in serial axial flow relationship about a longitudinal centerline axis of the engine. The high pressure turbine is drivingly connected to the high pressure compressor via a first rotor shaft, and the low pressure turbine is drivingly connected to both the fan and booster via a second rotor shaft. The fan includes an annular disk, rotatable about the longitudinal centerline of the engine, and a plurality of radially extending blades mourned on the disk. Each blade has a relatively large radial dimension and typically includes an airfoil, a platform and a radially inner dovetail. Radial retention of the blades is commonly achieved by inserting the dovetail of each blade into a mating axially extending dovetail slot formed in the disk, wherein the dovetail slots are equally spaced about the disk rim and wherein pressure faces of the blade dovetail are forced against mating faces of the dovetail slots during engine operation. In high bypass ratio turbofan engines, having blades with a relatively large radial dimension, the blades may also include interlocking mid-span shrouds to prevent excessive blade deflection and to dampen blade vibration. With shrouded blades, it is common to utilize oversized dovetail slots to facilitate blade removal, wherein the radial height of the dovetail slot is greater than the radial height of the blade dovetail thereby allowing the blade to be moved radially inward in the slot and disengaged from the shrouds of adjacent blades. In this instance radial spacers are commonly inserted between the inner surface of the blade dovetail and the bottom of the dovetail slot to keep the dovetail pressure faces in abutting relationship with the mating faces of the dovetail slot so as to prevent undesirable blade clanking and the associated dovetail pressure face coating wear during periods of windmilling.

In addition to radial retention, axial retention of fan blades has been a continuing problem for the industry. Although axial retention is required in both directions, the following discussion focuses on axial retention in the forward direction, which is the subject of the present invention. During engine operation, a fan blade may encounter foreign objects such as birds or debris picked up along a runway, or more infrequently, a failed blade or blade fragment may be released wherein a trail blade may impact the released blade or blade fragment. In either case, when a blade encounters a foreign or domestic object, the affected blade pushes the object aft due to the blade camber. This results in a reaction force, which can be relatively high in the case where a blade impacts a released blade or blade fragment, which tends to force the affected blade out of the dovetail slot in a forward direction. Interaction between rotating and non-rotating components, which may be caused by excessive blade tip rubs, can result in an induced rotor system vibratory response which presents another scenario which can result in relatively high axial loads which tend to force one or more of the blades out of the corresponding dovetail slots in an axially forward direction.

One prior method for providing axially forward retention of fan blades in gas turbine engines may be referred to as the "double bar system." In this system a pair of bars are inserted between the inner surface of the blade dovetail and the bottom of the dovetail slot, on either side of a radial spacer. Each bar has an enlarged aft portion which hooks around the aft face of a disk post positioned adjacent to the dovetail, and an enlarged forward portion which engages the forward surfaces of both the blade dovetail and the disk. After assembly, the two axial retention bars and the intervening radial spacer are then bolted together, wherein radial retention of the bars and the spacer is provided by the positioning of each element under the blade dovetail and the conventional radial retention of the blade. While the "double bar system" has proven to be an effective method of axially retaining fan blades, in both directions, the "double bar system" is not weight efficient.

Another prior method for providing axial retention, in a forward direction, of fan blades in gas turbine engines may be referred to as the "shear plate system" which is more weight efficient than the "double bar system." With the "shear plate system," axially extending lugs protrude from the forward face of each disk post wherein each lug includes a pair of radially extending and circumferentially facing slots formed in each circumferential end of the lug. Each lug slot is open adjacent to the dovetail slot such that opposing slots in adjacent lugs may slidingly accept a shear plate. The shear plate closes off the forward end of the dovetail slot and comprises a generally rectangular cross-section. The circumferentially facing ends of the shear plate extend along generally radial lines and are generally parallel such that the cross-section of the plate is generally constant along the radial height of the plate. The shear plate further comprises a flat axially aft facing surface and a mount bracket protruding from an otherwise flat axially forward facing surface. The mount bracket includes an enclosed interior hole which accepts conventional fastening means for fixedly attaching the bracket to a radial spacer positioned under the blade dovetail, thereby providing radial retention of the shear plate. The flat axially aft facing surface spans the full circumferential width and radial height of the blade dovetail such that when large reaction forces tend to drive the blade forwardly out of the dovetail slot the entire forward face of the blade dovetail contacts the flat axially aft facing surface of the shear plate. The axial force from the blades is reacted through the plate into the disk lugs at the areas of contact between the shear plate and the slots formed in the disk lugs.

Although the "shear plate system" has proven to be an effective retention system for certain applications, an analysis and component testing conducted by the present inventors associated with a potential application for larger turbofan engines, having significantly higher axial load requirements, revealed the following problems associated with the prior "shear plate system" which remained unsolved prior to the present invention. One problem with the prior "shear plate system" is that both the shear plate and the two adjacent disk lugs which contact the shear plates are loaded unevenly due to the application of axial forces from a fan blade for the following reasons. With the exception of the axial location corresponding to the circumferentially facing slots formed in the disk lugs, the contour of the disk lugs is determined by the shape of the dovetail slots formed in the disk. Since the shear plate spans the circumferential width and radial height of the dovetail and since the aft surface of the plate is flat, the full forward face of the blade dovetail contacts the flat aft surface of the plate when the axial force is applied to the blade. As the axial force is reacted through the plate, the center of the plate deflects which causes the load to be transferred to the portion of the plate corresponding to the edges of the dovetail around the dovetail periphery, wherein the loads are then reacted through circumferentially adjacent portions of the disk lugs. Since the outer contour of the disk lugs is determined by the dovetail slots, the contour of the lugs is nearly circumferentially aligned with the blade dovetail in the area corresponding to the dovetail pressure faces (one on each circumferential side of the dovetail) and is circumferentially offset from the blade dovetail contour at locations radially outward and radially inward from the dovetail pressure faces. This allows the shear plate edges to deflect in areas above and below the dovetail pressure faces which in turn causes a disproportionate amount of the axial force to be reacted in the portion of the plate adjacent the dovetail pressure faces where the local deflection in the plate is relatively limited. The aforementioned near circumferential alignment between the dovetail pressure faces and the adjacent areas of each of the two corresponding disk lugs creates a "scissoring" action which results in a primarily shear load being applied to the corresponding areas of the plate. The applied shear load can be relatively high due to the aforementioned uneven load distribution resulting in a premature shear failure of the plate, i.e., a failure corresponding to a significantly lower axial force than would be predicted based upon an even load distribution in the plate. The aforementioned "scissoring" action also causes the disk lugs to be unevenly loaded which can result in a premature failure of the lugs.

Another problem with the prior "shear plate system" is that the mount bracket, which protrudes from the forward surface of the shear plate and which includes an enclosed interior hole, locally increases the bending stiffness of the shear plate which further compromises the ability of the shear plate to evenly distribute the reaction forces over the contact area with the disk lugs.

The lug slots which accept the shear plate define a minimum circumferential width of the lug cross-section throughout the radial height of the disk lugs. The fact that the circumferential ends of the shear plate are generally parallel and extend along generally radial lines creates yet another problem with the prior "shear plate system" since the configuration of the circumferential ends of the shear plates results in an inadequate circumferential width of the disk lugs in the area of highest loading.

In view of the foregoing, prior to this invention a need existed for an improved blade retaining sub-assembly to resolve the problems associated with prior retention systems and thereby provide increased capability for axial retention of blades in a cost and weight efficient manner.

SUMMARY OF THE INVENTION

The present invention is directed to a blade retaining sub-assembly in a gas turbine engine having an annular disk which is rotatable about a longitudinal axis of the engine and at least one radially extending blade mounted on the disk, wherein the disk includes a plurality of circumferentially alternating posts and dovetail slots disposed about a rim of the disk and axially extending across the rim, and wherein a dovetail portion of the at least one blade is received by one of the dovetail slots, wherein the dovetail portion includes first and second lateral surfaces and an axially forward facing surface extending between the lateral surfaces.

According to a preferred embodiment of the present invention, the blade retaining sub-assembly comprises first and second circumferentially spaced lugs extending axially forward from circumferentially adjacent ones of the disk posts such that the first and second lugs are disposed axially forward of, and circumferentially adjacent to, respective ones of the lateral surfaces of the dovetail portion of the radially extending blade. The sub-assembly further comprises means formed in each of the first and second lugs for receiving a retainer plate, wherein the retainer plate prevents the blade from migrating from the corresponding dovetail slot in an axially forward direction. The retainer plate includes a body section and a contoured platform which is disposed about a circumferentially central portion of the body section and extends axially aftward from an aft surface of the body section such that the contoured platform is in confronting relationship with the axially forward facing surface of the dovetail portion of the blades. The contoured platform includes a periphery which is predeterminedly shaped and positioned so as to enhance a load carrying capability of the retainer plate and the first and second lugs.

Another preferred embodiment in accordance with the present invention includes the following additional structural features and function. The body section of the retainer plate includes first and second circumferentially facing sides which each have a generally radially extending inner portion and a tapered outer portion which is tapered toward the central portion of the body section. The retainer plate receiving means comprises first and second slots formed in the first and second lugs, respectively, wherein the slots are formed so as to receive corresponding ones of the first and second sides of the retainer plate body section. The sub-assembly further comprises means for radially restraining the retainer plate, wherein the means for restraining comprises a bracket protruding from an axially forward surface of the body section of the retainer plate, a spacer having an axially aft portion disposed within the corresponding dovetail slot radially inward of the dovetail portion and fastening means for attaching the bracket to the spacer. The bracket comprises a circumferentially extending top flange and a pair of radially extending and circumferentially spaced side flanges, each of the side flanges being attached to the top flange. The bracket further includes an interior hole formed in the top flange. The spacer includes a forward portion disposed between the pair of side flanges and radially inward of the top flange of the bracket, wherein the forward portion of the spacer includes a mount hole which is aligned with the interior hole of the bracket. The bracket further includes a slot extending axially aftward from a forward surface of the bracket to the interior hole, wherein the slot enhances a capability of the retainer plate to flex about an axis which is generally parallel to a radially extending centerline passing through the interior hole. The sub-assembly further comprises a back-up means for radially restraining the retainer plate comprising first and second tabs protruding from the axially forward surface of the body section of the retainer plate, wherein the first tab is positioned proximate a radially inward facing portion of a lateral surface of the first lug, and wherein the second tab is positioned proximate a radially inward facing portion of a lateral surface of the second lug.

BRIEF DESCRIPTION OF THE DRAWINGS

The structural features and function of the present invention, as well as the advantages derived therefrom, will become apparent from the subsequent detailed description of the preferred embodiments when taken in conjunction with the accompanying drawings in which.

DETAILED DESCRIPTION

Figure 1:
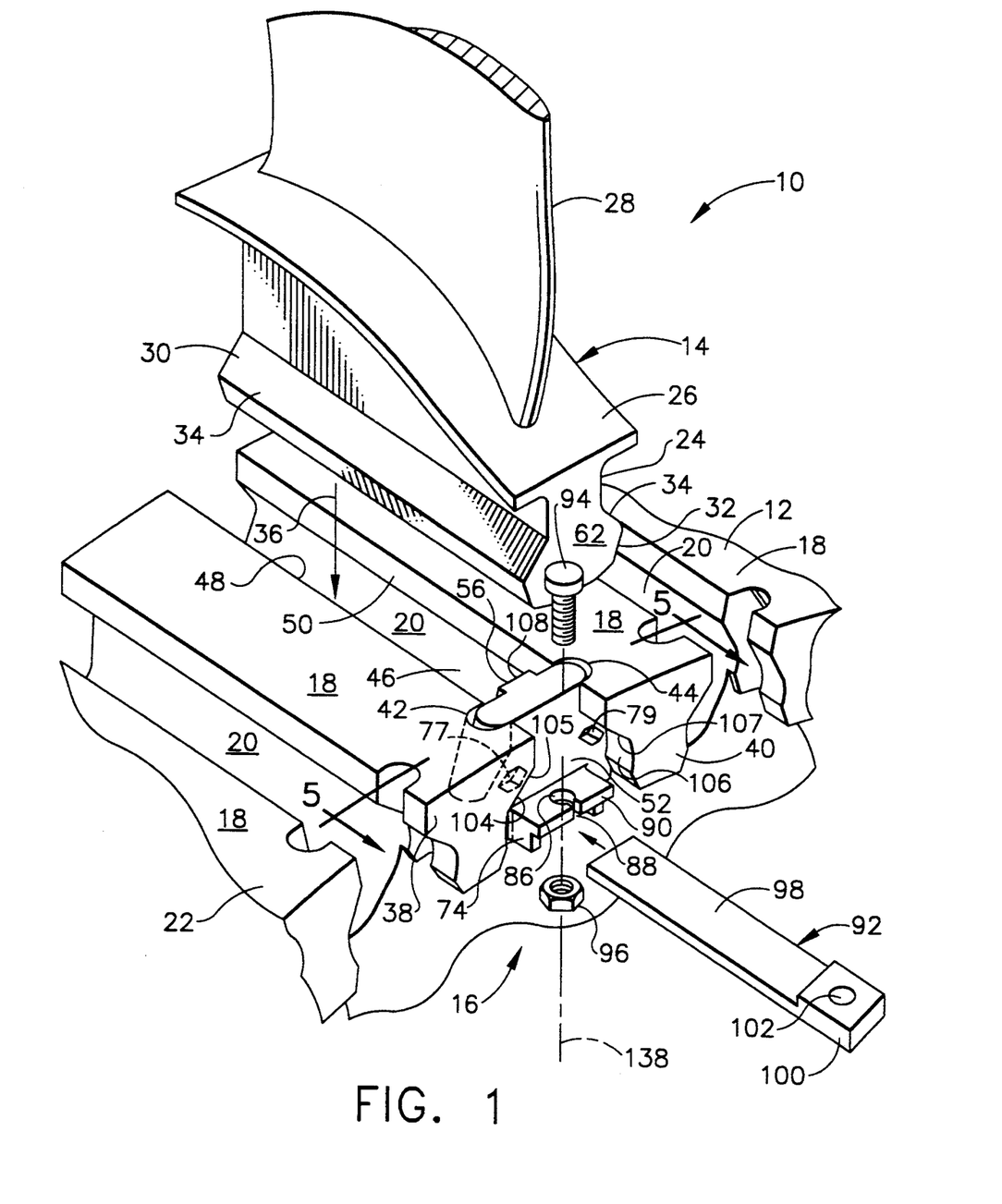
FIG. 1 is a fragmentary perspective view illustrating a fan assembly of a gas turbine engine which incorporates the blade retaining sub-assembly of the present invention.
Figure 6:
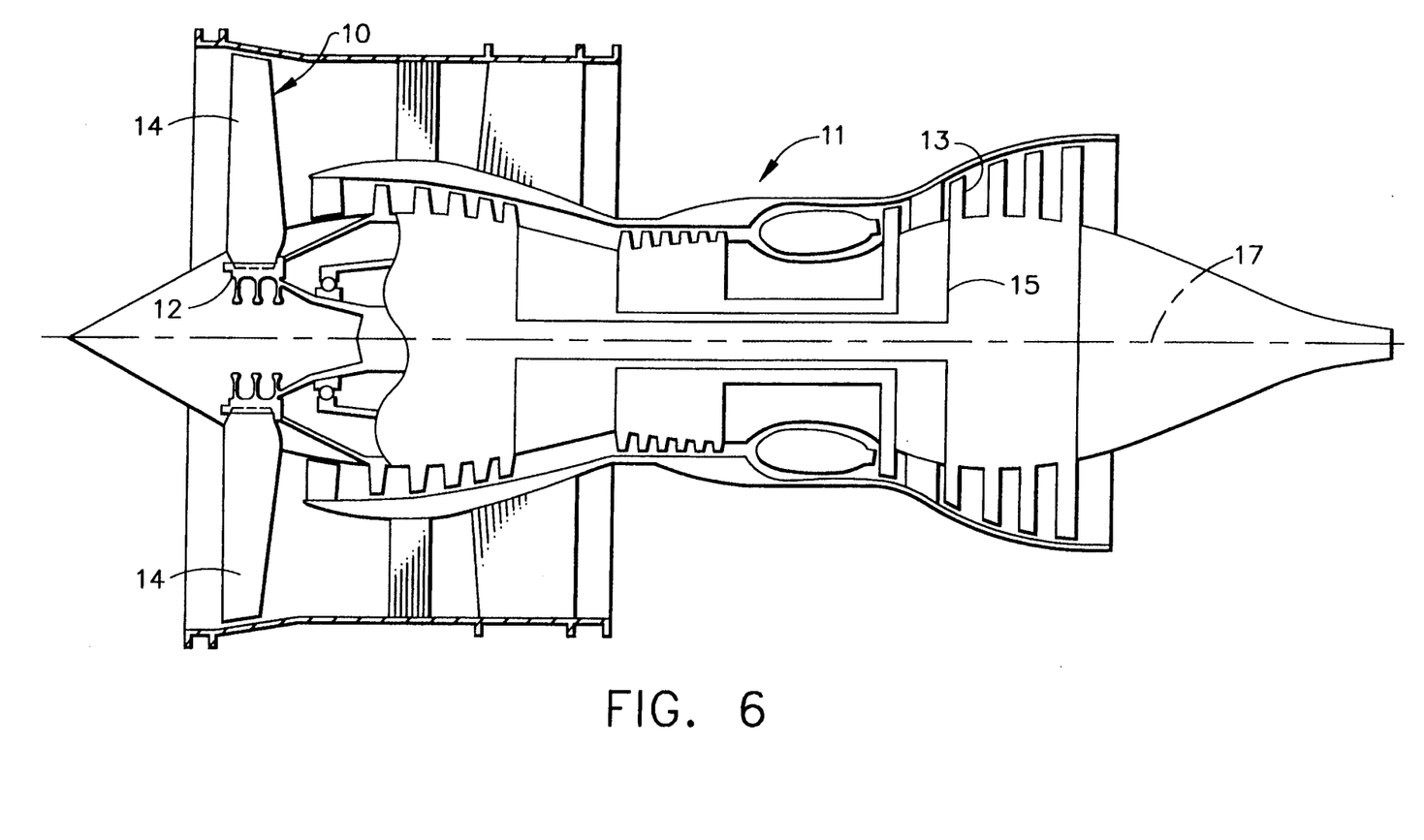
FIG. 6 is a longitudinal cross-section illustrating an exemplary gas turbine engine which can incorporate the blade retaining sub-assembly of the present invention.

Referring now to the drawings, wherein like reference numerals have been used for similar elements throughout, FIG. 1 illustrates a fragmentary perspective view of a fan assembly 10 of a gas turbine engine 11 which is illustrated in FIG. 6. Fan assembly 10 is drivingly connected to a low pressure turbine 13 of the gas turbine engine 11 by a rotor shaft 15 in a conventional manner and is rotatable about an axially extending longitudinal axis 17 of the gas turbine engine 11. As shown in FIG. 1, fan assembly 10 comprises an annular disk 12, a radially extending fan blade 14 and a blade retaining sub-assembly depicted generally at 16. Annular disk 12 includes a plurality of circumferentially alternating posts 18 and dovetail slots 20 disposed about a rim 22 of disk 12, wherein posts 18 and slots 20 extend axially across the rim. Radially extending fan blade 14 includes a dovetail portion 24, a platform portion 26 and an airfoil portion 28, wherein dovetail portion 24 includes first and second lateral surfaces 30, 32, and wherein each of the surfaces 30 and 32 includes a pressure face 34. For purposes of clarity with respect to blade retaining sub-assembly 16, FIG. 1 depicts fan blade 14 in a non-assembled position. However, it should be understood that fan blade 14 is mounted on disk 12 in a conventional manner by inserting dovetail portion 24 of blade 14 into the dovetail slot 20 of disk 12 which is denoted by location arrow 36. Arrow 36 only depicts the location of blade 14 corresponding to sub-assembly 16 and does not indicate the direction of installation of blade 14. Instead, blade 14 is positioned forward of the corresponding dovetail slot 20 and is then slid into slot 20 in an axially aft direction prior to installing blade retainer sub-assembly 16 as discussed in more detail subsequently. Furthermore, although FIG. 1 only depicts one fan blade 14 it should be understood that fan assembly 10 includes a plurality of fan blades 14 as illustrated in FIG. 6, wherein the dovetail portion 24 of each fan blade 14 is inserted into a corresponding dovetail slot 20 of disk 12.

Radial retention of each blade 14 is accomplished in a conventional manner wherein pressure faces 34 of dovetail lateral surfaces 30 and 32 are urged radially outward against the mating surfaces of the corresponding dovetail slot 20 due to the centrifugal forces acting on each blade 14 during the operation of the gas turbine engine 11. Blades 14 are prevented from exiting dovetail slot 20 in an axially aft direction by an aft retention means (not shown), which is positioned proximate an aft end of slot 20 and which is not the subject of the present invention.

Again referring to FIG. 1, there is depicted the blade retaining sub-assembly 16 of the present invention, wherein sub-assembly 16 prevents the corresponding blade 14 from exiting dovetail slot 20 in an axially forward direction. For ease in explanation, the following description of sub-assembly 16 pertains to the retention of a single fan blade 14 in a single dovetail slot 20 denoted by location arrow 36. However, it should be understood that the present invention applies in the same manner to the plurality of fan blades 14, and consequently, in the preferred embodiment fan assembly 10 comprises a plurality of blade retaining sub-assemblies 16.

Blade retaining sub-assembly 16 comprises first and second circumferentially spaced lugs 38 and 40, respectively, extending axially forward from circumferentially adjacent ones of disk posts 18 such that lugs 38 and 40 are disposed axially forward of, and circumferentially adjacent to, lateral surfaces 30 and 32, respectively, of dovetail portion 24 of blade 14. Preferably, lugs 38 and 40 are integrally formed with disk 12. Sub-assembly 16 further comprises a first circumferentially facing slot 42 formed in lug 38 and a second circumferentially facing slot 44 formed in lug 40. Slots 42 and 44 are each disposed axially adjacent a forward end 46 of dovetail slot 20 and circumferentially adjacent opposing sides 48, 50 of dovetail slot 20. Furthermore slots 42 and 44 are open adjacent dovetail sides 48 and 50, respectively, such that slots 42 and 44 may slidingly receive retainer plate 52.

Figure 2:
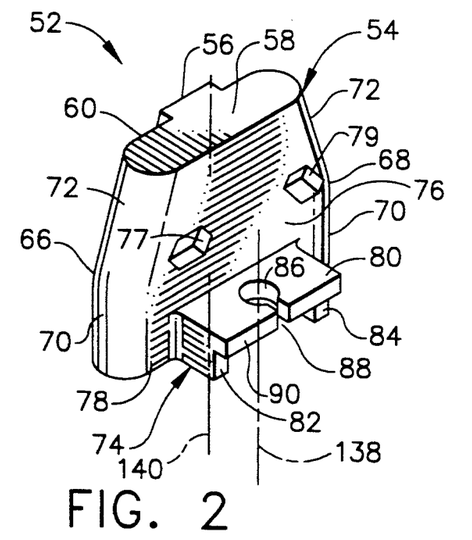
FIG. 2 is a perspective view illustrating the axially forward, as installed, features of the retainer plate of the present invention.
Figure 3:
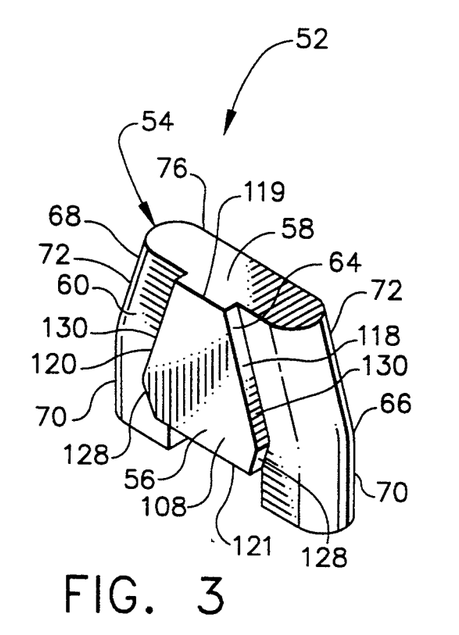
FIG. 3 is a perspective view illustrating the axially aft, as installed, features of the retainer plate of the present invention.
Figure 4:
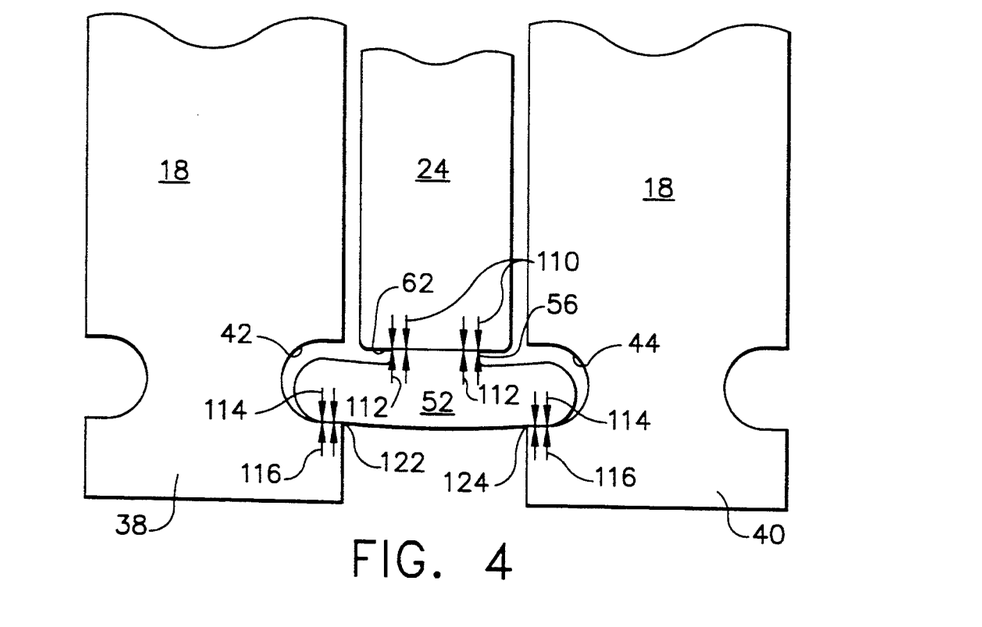
FIG. 4 schematically illustrates applied blade axial forces and the corresponding reaction forces of the blade retaining sub-assembly of the present invention.

Retainer plate 52 is illustrated in greater detail in FIGS. 2 and 3 which are perspective views which illustrate, respectively, the axially forward and axially aft, as installed features of retainer plate 52. Retainer plate 52 includes a body section 54 and a contoured platform 56. Contoured platform 56 is disposed about a circumferentially central portion 58 of body section 54 and extends axially aftward from an aft surface 60 of body section 54 such that contoured platform 56 is in confronting relationship with an axially forward facing surface 62 of dovetail portion 24 of blade 14, as best seen in FIGS. 1 and 4. Contoured platform 56 includes a periphery 64 which is predeterminedly shaped and positioned for subsequently described purposes. Body section 54 includes first and second circumferentially facing sides 66 and 68, respectively, wherein each of sides 66 and 68 include a generally radially extending inner portion 70 and a tapered outer portion 72, wherein outer portion 72 tapers toward circumferentially central portion 58 of body section 54. Circumferentially facing slot 42 of lug 38 and circumferentially facing slot 44 of lug 40 are each formed so as to receive sides 66 and 68, respectively of body section 54 of retainer plate 52. When installed, retainer plate 52 closes off the forward end 46 of dovetail slot 20 and prevents blade 14 from migrating from slot 20 in an axially forward direction. As best seen in FIG. 2, retainer plate 52 includes a bracket 74 which protrudes from an axially forward surface 76 of body section 54. Bracket 74 is disposed about a radially inner portion 78 of body section 54 and includes a circumferentially extending top flange 80 and a pair of radially extending and circumferentially spaced side flanges 82 and 84, wherein each of the side flanges 82 and 84 are attached to top flange 80. Bracket 74 further includes an interior hole 86 formed in top flange 80 and a slot 88 which extends axially aftward from a forward surface 90 of bracket 74 to interior hole 86, wherein slot 88 performs a subsequently described function. Body section 54, contoured platform 56 and bracket 74 of retainer plate 52 preferably are made of a one-piece construction.

Sub-assembly 16 further includes a means for radially restraining retainer plate 52 comprising bracket 74, spacer 92, and conventional fastening means such as bolt 94 and nut 96, as illustrated in FIG. 1. Spacer 92 has an aft potion 98 which is disposed within dovetail slot 20 radially inward of dovetail potion 24 of blade 14. A forward portion 100 of spacer 92 is disposed between side flanges 82 and 84 of bracket 74 and radially inward of top flange 80 of bracket 74, wherein a mount hole 102 formed in the forward portion 100 of spacer 92 is aligned with interior hole 86 of bracket 74. Bolt 94 is inserted through aligned holes 86 and 102 wherein nut 96 is secured to bolt 94, thereby attaching bracket 74 to spacer 92.

During engine operation, centrifugal forces acting on blade 14 tend to force blade 14 radially outward which forces pressure faces 34 of dovetail portion 24 outward against the corresponding mating faces included in sides 48 and 50 of dovetail slot 20, thereby radially restraining blade 14 within slot 20 in a conventional manner. Since spacer 92 is disposed radially inward of dovetail portion 24, the aforementioned radial retention of blade 14 also provides radial retention of spacer 92 within dovetail slot 20. Due to the attachment of bracket 74 to spacer 92, retainer plate 52 is also restrained radially during operation of engine 11. In a preferred embodiment a back-up means for radially restraining plate 52 is provided to ensure that plate 52 does not become wedged within slots 42 and 44 in the event that bolt 94 fails. If the back-up means for radially restraining plate 52 was not utilized and bolt 94 failed, plate 52 would move radially outward within slots 42 and 44 during high speed operating of engine 11 by an amount determined by the corresponding expansion of disk 12 at high speed operation. Plate 52 could not exit slots 42 and 44 which are formed so as to receive sides 66 and 68, respectively, of body section 54 of plate 52 as stated previously, wherein sides 66 and 68 each include a radially extending inner portion 70 and a tapered outer portion 72. However, without the use of the back-up means for radially restraining plate 52, frictional contact between sides 66 and 68 and slots 42 and 44, respectively, may prevent plate 52 from moving radially inward to its normal position as the engine 11 is decelerated to lower speed operation which in turn could result in undesirable high stresses in lugs 38 and 40 due to the natural tendency of disk 12 to contract during the deceleration of engine 11. The back-up means for radially restraining plate 52 comprises a pair of tabs 77 and 79 protruding from forward surface 76 of body section 54 and disposed such that tab 77 is positioned proximate a radially inward facing portion 105 of a lateral surface 104 of lug 38 and tab 79 is positioned proximate a radially inward facing portion 107 of a lateral surface 106 of lug 40. A predetermined relatively small radially outward movement of plate 52 will cause tab 77 to abut the radially inward facing portion 105 of surface 104 of lug 38 and will similarly cause tab 79 to abut the radially inward facing portion 107 of surface 106 of lug 40, thereby preventing plate 52 from becoming wedged in slots 42 and 44 in the event bolt 94 fails.

Blade 14 and the previously discussed components of blade retaining subassembly 16 are assembled as follows. Blade 14 is positioned axially forward of disk 12 and is then passed between lateral surfaces 104 and 106 of lugs 38 and 40, respectively, and inserted into dovetail slot 20 with an axially aftward motion. Lateral surfaces 104 and 106 of lugs 38 and 40 are preferably machined at the same time that opposing sides 48 and 50 of dovetail slot 20 are formed such that surfaces 104 and 106 are aligned with sides 48 and 50. However, this is not required and surfaces 104 and 106 may comprise a different shape provided that they do not invade a space corresponding to the shape of slot 20 and therefore do not prevent the insertion of blade 14 into slot 20. After blade 14 has been inserted into slot 20, retainer plate 52 is positioned radially inward of slots 42 and 44 after which plate 52 is inserted into slots 42 and 44 with a radially outward motion. Aft portion 98 of spacer 92 is then passed between side flanges 82 and 84 of bracket 74 and inserted into dovetail slot 20 radially inward of dovetail portion 24 of blade 14. Bracket 74 is then attached to spacer 92 by passing bolt 94 through interior hole 86 in bracket 74 and mount hole 102 in spacer 92 and securing bolt 94 with nut 96. In addition to comprising an element of the means for radially restraining plate 52, as previously discussed, spacer 92 also establishes the correct radial position of blade 14 in an assembled condition. Also, spacer 92 facilitates removal of blade 14 from a fully bladed fan assembly 10, wherein the removal of spacer 92 allows blade 14 to be moved radially inward in slot 20 which facilitates the disengagement of a mid-span shroud (not shown) of blade 14 from the shrouds (also not shown) of adjacent ones of blades 14. Also, different forms of spacers may be used, as compared to spacer 92 which is illustrated in FIG. 1, without compromising the function of blade retaining sub-assembly 16. For instance, in a preferred embodiment the spacer comprises an arcuate spring member positioned within slot 20 radially inward of dovetail portion 14 and a separable key attached to a forward portion of the spring and to bracket 74. With this preferred embodiment the assembly sequence of the components is as described previously with the exception that a tool is used to straighten the spring member after it is inserted in slot 20 which causes blade 14 to be preloaded radially outward. The separable key is then installed in the gap between the deflected forward portion of the spring member and both bracket 74 and dovetail portion 24 of blade 14, whereafter the tool is removed.

Figure 5:
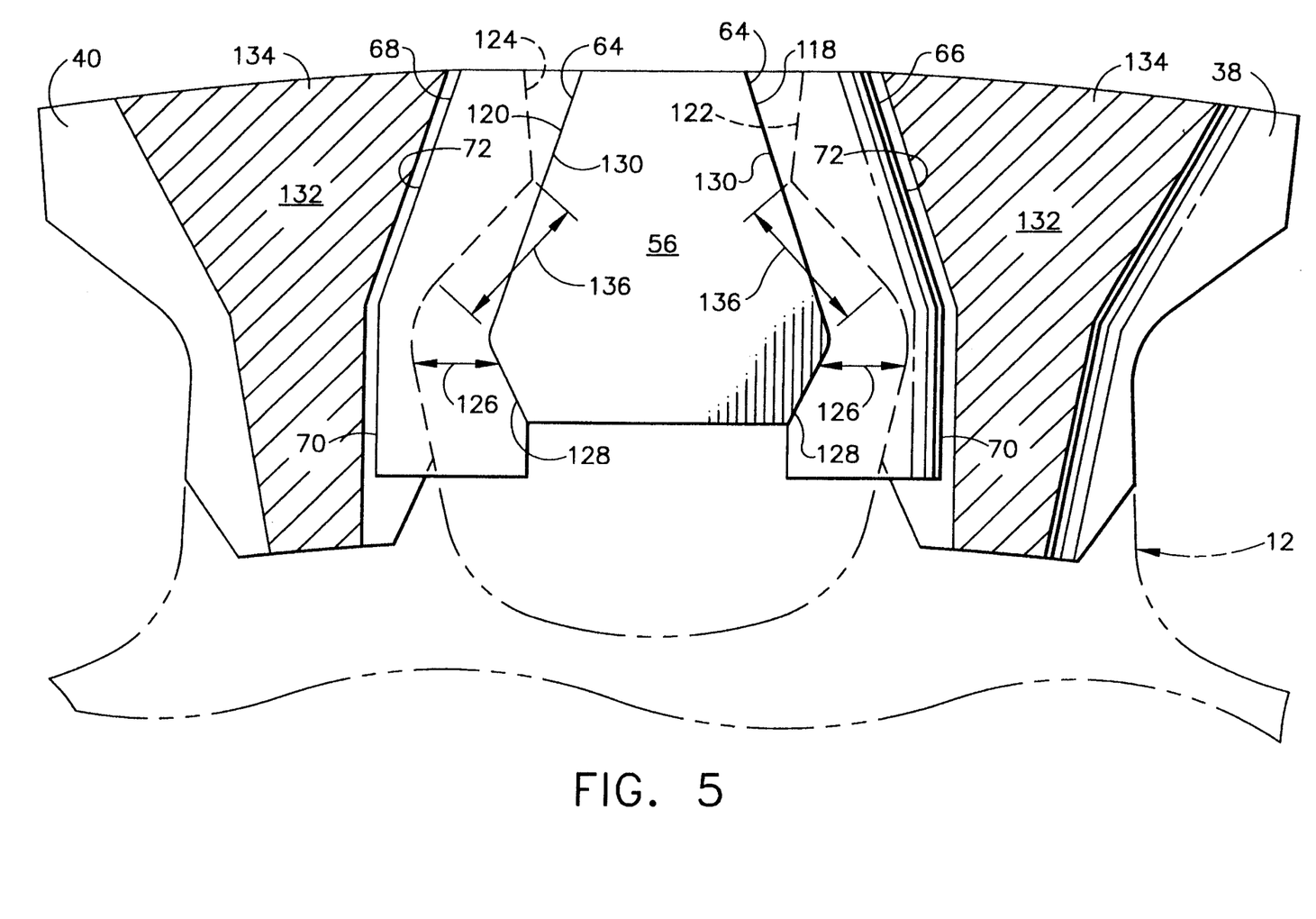
FIG. 5 is a sectional view taken along line 5—5 in FIG. 1 illustrating the circumferential relationships among the retainer plate and disk lugs of the present invention.

The structural features and functions of the predetermined shape and position of periphery 64 of contoured platform 56, which are of primary importance in the present invention, may be more fully appreciated with references to FIGS. 3-5. During normal operation of engine 11 aerodynamic forces load blade 14 axially forward such that the forward facing surface 62 of the dovetail portion 24 contacts aft facing surface 108 of contoured platform 56 or such that surfaces 62 and 108 are separated by a relatively small axial gap due to contact frictional forces applied to dovetail portion 24 resulting from contact with sides 48 and 50 of dovetail slot 20. During engine operation blade 14 may infrequently encounter a bird or other debris, or more infrequently, may encounter a failed blade or blade fragment. Additionally, an interaction between rotating and non-rotating components, caused by excessive rubs between blade 14 and the surrounding stationary structure shown in FIG. 6, can result in an induced vibratory response of fan assembly 10. When these infrequent events occur, relatively large axial forces tend to drive dovetail portion 24 axially forward wherein surface 62 of dovetail portion 24 contacts surface 108 of contoured platform 56. When this occurs axial forces 110 are applied to plate 52 and reacted by forces 112, as shown in FIG. 4. This in turn causes forces 114 to be applied to each of lugs 38 and 443, which are reacted by forces 116. Initially forces 110 are applied generally over the full extent of surface 108 of platform 56. However, as plate 52 starts to deflect, applied forces 110 and the corresponding reaction forces 112 are transferred generally to the periphery 64 of contoured platform 56 such that forces 110 are primarily applied along the aft edges of first and second side portions 118 and 120, respectively, of periphery 64, wherein the aft edges of a radially outward facing outer portion 119 and a radially inward facing inner portion 121 of periphery 64 are relatively lightly loaded. Similarly, applied loads 114 and reaction loads 116 are transferred to the edges 122 and 124, of slot 42 of lug 38 and slot 44 of lug 40, respectively. First side portion 118 of periphery 64 and second side portion 120 of periphery 64 are not parallel but are mirror images of one another and periphery 64 is disposed generally symmetrically about the circumferentially central portion 58 of body section 54 such that a generally circumferentially extending distance 126 separates edge 122 of slot 42 from first side portion 118 of periphery 64 and similarly separates edge 124 of slot 44 from second side portion 120 of periphery 64, as illustrated in FIG. 5. First side portion 118 and second side portion 120 each include a radially inward facing inner portion 128 and a radially outward facing outer portion 130. The magnitude of distance 126 varies in a radially extending direction along side portions 118 and 120 between outer and inner portions 119 and 121, respectively, of periphery 64, wherein the magnitude of distance 126 determines the nature of the loading locally in plate 52 and lugs 38 and 40.

Using a computer-assisted analysis the inventors determined the optimum shape and position of periphery 64, by defining distance 126 along side portions 118 and 120 of periphery 64 as follows. Lugs 38 and 40 and plate 52 were each analyzed at a plurality of radially spaced locations and, for each of lugs 38 and 40, distance 126 was adjusted at each location such that the maximum strain occurring at all of the locations was approximately equal, wherein the maximum strain resulted from the aforementioned relatively large axial forces driving dovetail portion 24 against contoured platform 56 of retain plate 52. Using this criteria, the predetermined shape and position of periphery 64 of platform 56 enhances a load carrying capability of lugs 38 and 40 wherein the premature lug failure of the prior "shear plate system" due to uneven load distribution causing high local loads and the resulting strain, is avoided. The minimum cross-section 132 of each of lugs 38 and 40 occurs at an axial location corresponding to the axial center of either slot 42 in lug 38 or slot 44 in lug 40 and the axial center of a second slot formed in either lug 38 or lug 40 which forms a part of a circumferentially adjacent blade retaining sub-assembly 16. As can be appreciated from FIG. 5, the fact that sides 66 and 68 of body section 54 of plate 52 each include the tapered outer portion 72 increases the material existing in a radially outer portion 134 of minimum cross-section 132 relative to the prior "shear plate system" which includes a shear plate having sides extending generally along radial lines, which in turn reduces the magnitude of the maximum strain occurring in lugs 38 and 40 relative to that occurring in the lugs of the prior "shear plate system" for a given axial force applied to plate 52. Consequently, tapered outer portion 72 of sides 66 and 68 enhances a load carrying capability of lugs 38 and 40.

Plate 52 experiences a combination of shear and bending loads, wherein the magnitude of the bending component locally is determined by the corresponding magnitude of distance 126. As can be seen in the embodiment of the present invention illustrated in FIG. 5, periphery 64 is positioned circumferentially apart from edges 122 and 124, of slot 42 of lug 38 and slot 44 of lug 40, respectively, such that periphery 64 is positioned between edges 122 and 124. This allows plate 52 to bend slightly in the areas contacting edges 122 and 124, including those areas contacting region 136 of each edge 122 and 124, wherein region 136 is circumferentially aligned with a corresponding pressure face 34 of dovetail portion 24 of blade 14. Consequently, the "scissoring" action and associated high local shear loads and the premature plate failure of the prior "shear plate system" discussed in the Background Section is avoided in the present invention by the positioning of periphery 64 and therefore the predetermined shape and position of periphery 64 enhances a load carrying capability of plate 52 which is significantly increased relative to that of the shear plate of the prior "shear plate system."

The function of slot 88 of bracket 74 may be appreciated with reference to FIGS. 1 and 2. Slot 88 extends axially aftward from forward surface 90 of bracket 74 to interior hole 86, and selectively reduces the bending stiffness of bracket 74 about a radially extending centerline 138 which passes through interior hole 86. Consequently, slot 88 enhances a capability of plate 52 to flex, or bend, about an axis 140 which is generally parallel to centerline 138 by ensuring that the bending stiffness of plate 52 about axis 140 is not increased locally due to the presence of bracket 74, wherein such a local increase in bending stiffness of plate 52 would compromise the ability of plate 52 to correctly distribute reaction forces along edges 122 and 124, of slot 42 of lug 38 and slot 44 of lug 40, respectively. When blade 14 encounters the previously discussed foreign objects (birds or other debris) or the previously discussed domestic objects (failed blade or blade fragment) applied axial forces 110 may comprise impact loads. In these events plate 52 is required to absorb a certain amount of kinetic energy of blade 14 which must be stored in plate 52 in the form of potential energy of deformation. The combination of the predetermined shape and position of periphery 64 of contoured platform 56 and slot 88 of bracket 74 maximizes the potential energy of deformation, which may also be referred to as strain energy, which may be stored in plate 52 prior to failure of plate 52 by allowing plate 52 to bend about axis 140 in response to applied axial forces 110, and by avoiding a local increase in bending stiffness of plate 52 about axis 140, or stress concentrations in plate 52 due to bracket 74 protruding from axially forward surface 76 of body section 54 of plate 52, which would result in high local strain levels in plate 52 and cause premature failure of plate 52. Therefore, the maximum volume of material of plate 52 is raised to a high level of strain prior to failure of plate 52 and since the strain energy stored in plate 52 is effectively the product of stress and strain throughout plate 52, the total strain energy which may be stored in plate 52 is increased relative to that which may be stored in the shear plate of the prior "shear plate system" for a given volume of material. Consequently, for a given axial force applied to blade 14, plate 52 may be manufactured from a lighter and less costly material. Preferably, plate 52 is manufactured from a standard grade titanium such as those defined by AMS 4911or AMS 4928. Slot 88 does not significantly reduce the bending stiffness of bracket 74 in other directions and consequently, bracket 74 can still perform the primary function of carrying the centrifugal loads created by the mass of plate 52 and bracket 74 during operation of engine 11.

In operation, in the event that blade 14 contacts foreign or domestic objects or in the event that excessive rubs occur between blade 14 and the surrounding stationary structure which can result in an induced vibratory response of fan assembly 10, wherein any of the foregoing events can result in relatively high axially forward forces acting on blade 14, the blade retaining sub-assembly 16 of the present invention prevents blade 14 from migrating from dovetail slot 20 in an axially forward direction.

In conclusion, the blade retaining sub-assembly 16 of the present invention results in several advantages over prior retaining systems which include the following. The predetermined shape of the periphery 64 of the contoured platform 56 of retainer plate 52 increases a load carrying capability of lugs 38 and 40 and plate 52 relative to the lugs and shear plate of the prior "shear plate system." Slot 88 of bracket 74 allows radial retention of plate 52 to be provided without compromising the capability of plate 52 to correctly distribute reaction forces to lugs 38 and 40. Since the load carrying capability of plate 52 is increased, plate 52 may be manufactured from a lighter and less costly material than the plate of the prior "shear plate system" for a given axial load applied to blade 14. Accordingly, blade retaining sub-assembly 16 provides axially forward retention of blade 14 in a cost and weight efficient manner.

While the foregoing description has set forth the preferred embodiments of the invention in particular detail, it must be understood that numerous modifications, substitutions and changes can be undertaken without departing from the true spirit and scope of the present invention as defined by the ensuing claims. For example the aft surface of the retainer plate may be flat provided that the contoured platform, having the predeterminedly shaped and positioned periphery, is formed as an integral part of the fan blade and protrudes from the forward surface of the dovetail portion of the blade. The protection desired to be secured by Letters Patent of the United States for this invention is defined by the subject matter of the following claims.

What is claimed is:

1. In a gas turbine engine having an annular disk which is rotatable about a longitudinal axis of the engine and at least one radially extending blade mounted on the disk, the disk including a plurality of circumferentially alternating posts and dovetail slots disposed about a rim of the disk, the posts and slots extending axially across the rim, wherein a dovetail portion of the at least one blade is received by one of the dovetail slots, the dovetail portion including first and second lateral surfaces and an axially forward facing surface extending between the lateral surfaces, a blade retaining sub-assembly comprising:
   a) first and second circumferentially spaced lugs extending axially forward from circumferentially adjacent ones of the disk posts such that said first and second lugs are disposed axially forward of, and circumferentially adjacent to, respective ones of the lateral surfaces of the dovetail portion of the at least one blade; and
   b) means formed in each of said first and second lugs for receiving a retainer plate, said retainer plate preventing the at least one blade from migrating from the corresponding dovetail slot in an axially forward direction;
   c) said retainer plate including a body section and a contoured platform;
   d) said contoured platform being disposed about a circumferentially central portion of said body section and extending axially aftward from an aft surface of said body section such that said contoured platform is in confronting relationship with the axially forward facing surface of the dovetail portion of the at least one blade, said contoured platform including a periphery which is predeterminedly shaped and positioned so as to enhance a load carrying capability of said retainer plate and said first and second lugs.

2. A blade retaining sub-assembly as recited in claim 1, wherein said body section of said retainer plate includes first and second circumferentially facing sides, each of said sides having a generally radially extending inner portion and a tapered outer portion, said outer portion being tapered toward said central portion of said body section.

3. A blade retaining sub-assembly as recited in claim 2, wherein said receiving means comprises a first circumferentially facing slot formed in said first lug and a second circumferentially facing slot formed in said second lug, said first and second slots being formed so as to receive corresponding ones of said first and second sides of said body section of said retainer plate.

4. A blade retaining sub-assembly as recited in claim 1, further comprising:
   a) means for radially restraining said retainer plate;
   b) said means for radially restraining comprising a bracket protruding from an axially forward surface of said body section of said retainer plate, said bracket including an interior hole and a slot extending axially aftward from a forward surface of said bracket to said interior hole.

5. A blade retaining sub-assembly as recited in claim 4, wherein said means for radially restraining further comprises:

a) a spacer having an aft portion disposed within the corresponding dovetail slot radially inward of the dovetail portion of the at least one blade, said spacer including a mount hole formed in an axially forward portion of said spacer, said mount hole being aligned with said interior hole of said bracket;

b) fastening means for attaching said bracket to said spacer.

6. In a gas turbine engine having an annular disk which is rotatable about a longitudinal axis of the engine and at least one radially extending blade mounted on the disk, the disk including a plurality of circumferentially alternating posts and dovetail slots disposed about a rim of the disk, the posts and slots extending axially across the rim, wherein a dovetail portion of the at least one blade is received by one of the dovetail slots, the dovetail portion including first and second lateral surfaces and an axially forward facing surface extending between the lateral surfaces, a blade retaining sub-assembly comprising:

a) first and second circumferentially spaced lugs extending axially forward from circumferentially adjacent ones of the disk posts such that said first and second lugs are disposed axially forward of, and circumferentially adjacent to, respective ones of the lateral surfaces of the dovetail portion of the at least one blade;

b) means formed in each of said first and second lugs for receiving a retainer plate, said retainer plate preventing the at least one blade from migrating from the corresponding dovetail slot in an axially forward direction;

c) means for radially restraining said retainer plate, said means for radially restraining comprising a bracket protruding from an axially forward surface of a body section of said retainer plate;

d) said bracket comprising a circumferentially extending flange and an interior hole formed in said circumferentially extending flange, said bracket further comprising a slot extending axially aftward from a forward surface of said bracket to said interior hole, wherein said slot enhances a capability of said retainer plate to flex about an axis which is generally parallel to a radially extending centerline passing through said interior hole.

7. A blade retaining sub-assembly as recited in claim 6, wherein said means for radially restraining further comprises:

a) a spacer having an aft portion disposed within the corresponding dovetail slot radially inward of the dovetail portion of the at least one blade and a forward portion disposed radially inward of said circumferentially extending flange of said bracket, said forward portion including a mount hole which is aligned with said interior hole of said bracket;

b) fastening means for attaching said bracket to said spacer.

8. A blade retaining sub-assembly as recited in claim 7, wherein:

a) said body section of said retainer plate includes first and second circumferentially facing sides, each of said sides having a generally radially extending inner portion and a tapered outer portion, said outer portion being tapered toward a circumferentially central portion of said body section;

b) said receiving means comprises a first circumferentially facing slot formed in said first lug and a second circumferentially facing slot formed in said second lug, said first and second slots being formed so as to receive corresponding ones of said first and second sides of said body section of said retainer plate.

9. A blade retaining sub-assembly as recited in claim 8, wherein:

a) said retainer plate further includes a contoured platform, said contoured platform being disposed about said central portion of said body section and extending axially aftward from an aft surface of said body section such that said contoured platform is in confronting relationship with the axially forward facing surface of the dovetail portion of the at least one blade;

b) said contoured platform including a periphery which is predeterminedly shaped and positioned so as to enhance a load carrying capability of said retainer plate and said first and second lugs;

c) said circumferentially extending flange comprises a top flange of said bracket and said bracket further comprises a pair of radially extending and circumferentially spaced side flanges, each of said side flanges being attached to said top flange, said forward portion of said spacer being disposed between said pair of side flanges;

d) said sub-assembly further comprises a back-up means for radially restraining said retainer plate, said back-up means comprising first and second tabs protruding from said axially forward surface of said body section of said retainer plate, said first tab being positioned proximate a radially inward facing portion of a lateral surface of said first lug, said second tab being positioned proximate a radially inward facing portion of a lateral surface of said second lug.

10. A blade retaining sub-assembly as recited in claim 9, wherein said sub-assembly further comprises a back-up means for radially restraining said retainer plate, said back-up means comprising first and second tabs protruding from said axially forward surface of said body section of said retainer plate, said first tab being positioned proximate a radially inward facing portion of a lateral surface of said first lug, said second tab being positioned proximate a radially inward facing portion of a lateral surface of said second lug.

* * * * *